(12) United States Patent
Chen et al.

(10) Patent No.: US 8,851,876 B2
(45) Date of Patent: Oct. 7, 2014

(54) INJECTION MOLD

(75) Inventors: Yu-Ta Chen, New Taipei (TW);
Chien-Hsing Li, New Taipei (TW)

(73) Assignee: Foxnum Technology Co., Ltd., Taichung (TW)

( * ) Notice: Subject to any disclaimer, the term of this patent is extended or adjusted under 35 U.S.C. 154(b) by 30 days.

(21) Appl. No.: 13/616,649

(22) Filed: Sep. 14, 2012

(65) Prior Publication Data
US 2013/0108729 A1 May 2, 2013

(51) Int. Cl.
*B29C 45/80* (2006.01)
*B29C 45/50* (2006.01)

(52) U.S. Cl.
CPC ..... *B29C 45/5008* (2013.01); *B29C 2045/5056* (2013.01)
USPC .......................................... 425/145; 425/150

(58) Field of Classification Search
USPC .......................................... 425/145, 149, 150
See application file for complete search history.

(56) References Cited

U.S. PATENT DOCUMENTS 7,435,070 B2 * 10/2008 Shiraishi et al. .............. 425/145

* cited by examiner

*Primary Examiner* — Tim Heitbrink
(74) *Attorney, Agent, or Firm* — Novak Druce Connolly Bove + Quigg LLP

(57) ABSTRACT

An injection mold includes a first plate, a second plate, a movable plate, a ball screw, a ball nut, an injection screw, a transmission shaft, an injection motor, a metering motor, a first driving assembly and a second driving assembly. The ball screw is rotatably supported by the first plate. The ball nut is fixed to the movable plate, and is threadedly engaged with the ball screw. The injection screw is coaxially positioned with the ball screw. The transmission shaft is rotatably supported by the second plate. The injection motor is fixedly mounted on the first plate. The metering motor is fixed mounted on the second plate. The first driving assembly is connected to the injection motor to drive the ball screw. The second driving assembly is connected to the metering motor to rotate the transmission shaft for moving the injection screw.

6 Claims, 3 Drawing Sheets

INJECTION MOLD

BACKGROUND

1. Technical Field

The present disclosure relates to an injection mold.

2. Description of Related Art

Two-plate type injection mold commonly includes an injection servomotor connected to double ball screws for moving a movable plate, and a metering motor connected to an injection screw for moving the injection screw. The double ball screws can provide a high injection force. However, the ball screws are not coaxial with the injection screw. This structure easily produces an extra torque, and the movement of the two ball screws might be not synchronous.

Additionally, in work, the metering motor is firstly rotated under a control of a conventional control device for melting resin material and rotating the injection screw, and then the injection servomotor starts to rotate the ball screws to move the movable plate. However, when the ball screws rotate, the metering motor is caused to move because the metering motor is mounted on the movable plate. The metering motor will affect the injection performance.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
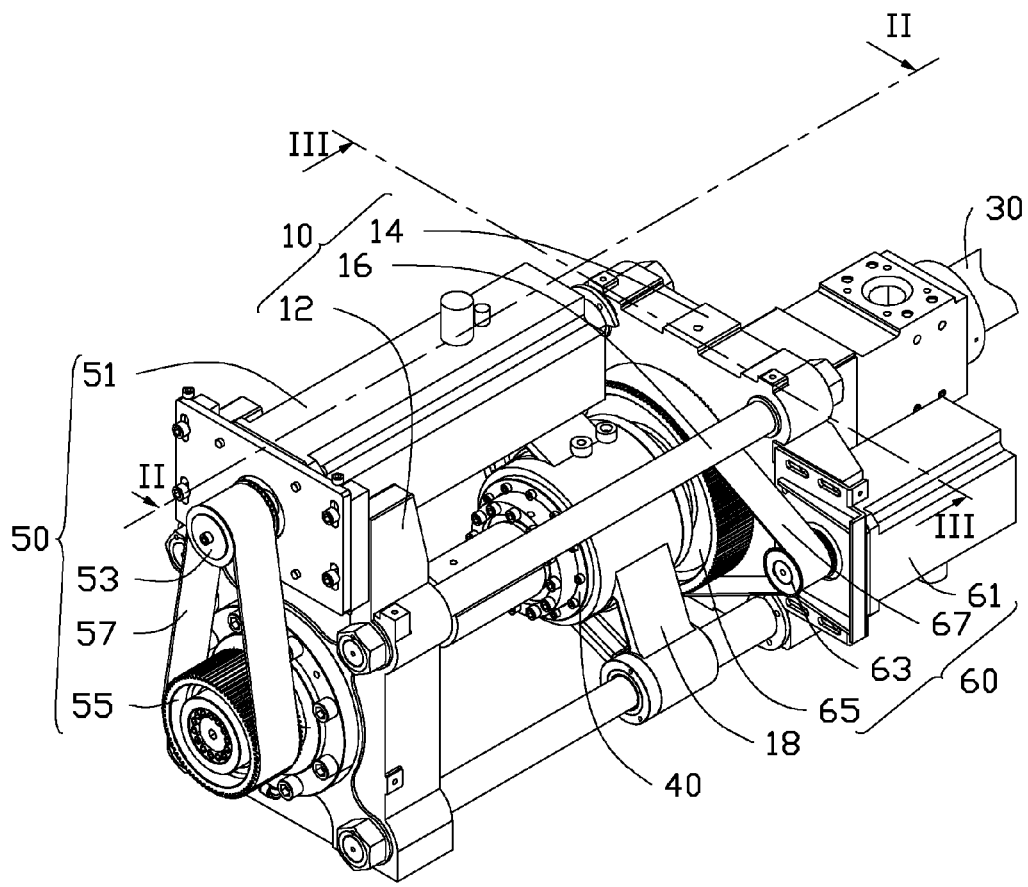
FIG. 1 is an isometric view of an injection mold.
Figure 2:
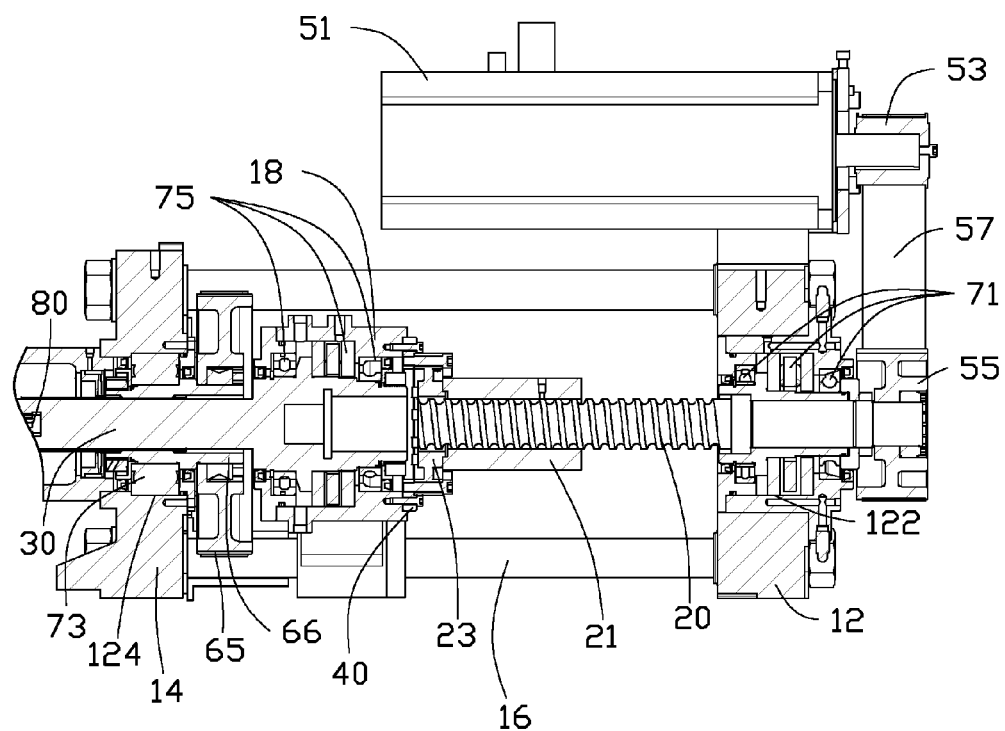
FIG. 2 is a cross-sectional view of the injection mold shown in FIG. 1 taken along line II-II.

FIGS. 1 and 2 show an injection mold 100 in one embodiment including a machine base 10, a ball screw 20, a ball nut 21, a load cell 23, a transmission shaft 30, a fixed element 40, a first driving assembly 50 and a second driving assembly 60.

The machine base 10 includes a first plate 12, a second plate 14 positioned parallel to the first plate 12, and a movable plate 18. A plurality of guiding poles 16 are mounted between the first plate 12 and the second plate 14. The first plate 12 defines a first axial hole 122, and the second plate 14 defines a second axial hole 124 to be in axial alignment with the first axial hole 122. The movable plate 18 is driven to move by the ball screw 20 along the guiding poles 16 between the first plate 12 and the second plate 14.

The ball screw 20 is rotatably connected to the first plate 12, and can be rotated by the first driving assembly 50. In this exemplary embodiment, the ball screw 20 is assembled in the first hole 122 with a first bearing group 71. One end of the ball screw 20 is connected to the first driving assembly 50 to allow the first driving assembly 50 to rotate the ball screw 20. The ball nut 21 is threadedly engaged with another end of the ball screw 20, and is fixed at the load cell 23. The load cell 23 is mounted to the fixed element 40, and the fixed element 40 is mounted to the movable plate 18. When the ball screw 20 is rotated, the ball nut 21 is forced to linearly move. Accordingly, the movable plate 18 is further driven to move forward and backward depending on the direction of rotation of the ball screw 20.

Figure 3:
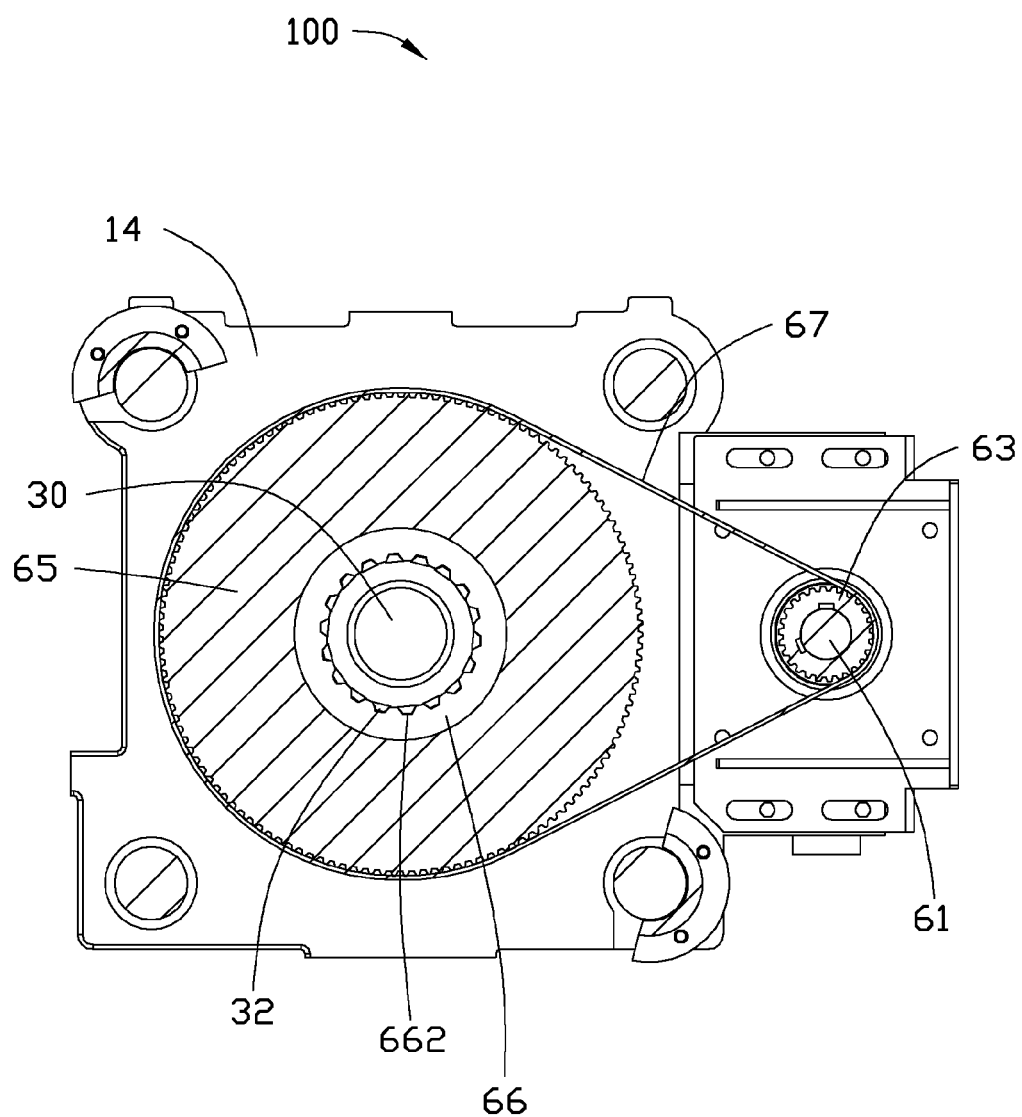
FIG. 3 is a cross-sectional view of the injection mold shown in FIG. 1 taken along line III-III.

Referring to FIG. 3, the transmission shaft 30 is rotatably mounted in the second hole 124 of the second plate 14 by a second bearing group 73, and is rotated by the second driving assembly 60. One end of the transmission shaft 30 is rotatably connected to the movable plate 18 by a third bearing group 75, and another end of the transmission shaft 30 has an injection screw 80 (partially shown). The transmission shaft 30 has a plurality of teeth 32 integrally formed together.

The first driving assembly 50 includes a servomotor 51, a first driving pulley 53, a first driven pulley 55 and a first belt 57. The servomotor 51 is fixed on the first plate 12. The servomotor 51 drives the first driving pulley 53 to rotate, and the first driven pulley 55 is rotated under the transmission of the first belt 57. The first driven pulley 55 further rotates the ball screw 20. The ball nut 21 is forced to linearly move. Accordingly, the movable plate 18 is further driven to move.

The second driving assembly 60 includes a metering motor 61, a second driving pulley 63, a second driven pulley 65, a sleeve 66 and a second belt 67. The metering motor 61 is mounted on the second plate 14 and drives the second driving pulley 63 to rotate. The second driven pulley 65 and the sleeve 66 are mounted together. The sleeve 66 defines a plurality of tooth grooves 662 engaging the teeth 32 of the transmission shaft 30. When the second driven pulley 65 rotates the sleeve 66, the transmission shaft 30 is caused to rotate. When the second driven pulley 65 with the sleeve 66 is stationary, the transmission shaft 30 is driven to axially slide in the tooth grooves 662 relative to the sleeve 66 by the movable plate 18.

In use, when the metering motor 61 is rotated, the second belt 67 rotates the second driven pulley 65 and the sleeve 66. Because of the engagement between the tooth grooves 662 engaging the teeth 32, the transmission shaft 30 is rotated relative to the movable plate 18 to cause the injection screw 80 to rotate for melting and sucking resin material. When the metering process is finished, the rotation of the metering motor 61 is stopped, while the rotation of the injection motor 51 is started. The servomotor 51 drives the first driving pulley 53 to rotate, and the first driven pulley 55 is rotated under the transmission of the first belt 57. The first driven pulley 55 further rotates the ball screw 20, which forces the ball nut 21 to move. The movable plate 18 further moves the transmission shaft 30 to allow the injection screw 80 to move forward to execute an injection process.

In this present disclosure, the ball screw 20 is coaxial with the injection screw 80. This will prevent the injection screw 80 and the ball screw 20 from suffering radial outside force improving the injection performance. Additionally, the metering motor 61 is mounted on the second plate 14, and is not fixed on the movable plate 18. The weight of the movable plate 18 is reduced for greatly improving the injection performance.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An injection mold, comprising:
   a first plate;
   a second plate;
   a movable plate;
   a ball screw rotatably supported by the first plate;

a ball nut fixed to the movable plate, the ball nut being threadedly engaged with the ball screw, the movable plate being moved by the ball nut between the first plate and the second plate;

a transmission shaft rotatably supported by the second plate, one end of the transmission shaft comprising an injection screw coaxially positioned with the ball screw, another end of the transmission shaft rotatably connected to the movable plate;

a first driving assembly comprising a servomotor fixed mounted on the first plate, the injection motor for rotating the ball screw; and a second driving assembly comprising a metering motor mounted on the second plate for rotating the transmission shaft to move the injection screw:

wherein the first plate and the second plate are fixed relative to each other, and the moveable plate is capable of moving between the first plate and the second plate.

2. The mold as claimed in claim 1, wherein a plurality of guiding poles are mounted between the first plate and the second plate for guiding the movable plate.

3. The mold as claimed in claim 1, wherein the injection mold includes a load cell, the ball nut is fixed at the load cell, and the load cell is further mounted to the movable plate.

4. The mold as claimed in claim 2, wherein the injection mold includes a fixing element, the fixing element is mounted on the movable plate, and the load cell is mounted on the fixing element.

5. The mold as claimed in claim 1, wherein the first driving assembly includes a first driving pulley, a first driven pulley and a first belt, the servomotor drives the first driving pulley to rotate, and the first driven pulley is forced to rotate under the transmission of the first belt, the first driven pulley further rotates the ball screw.

6. The mold as claimed in claim 5, wherein the second driving assembly includes a second driving pulley, a second driven pulley, a sleeve and a second belt, the second driven pulley is mounted to the sleeve, the sleeve defines a plurality of tooth grooves, the transmission shaft defines a plurality of teeth engaging in the tooth grooves, the second driven pulley is driven to rotate the sleeve, the sleeve rotates the transmission shaft, the transmission shaft is driven by the movable plate to axially slide relative to the sleeve.

\* \* \* \* \*